United States Patent [19]

Millier et al.

[11] 4,121,407

[45] Oct. 24, 1978

[54] HIGH CAPACITY HARVESTING APPARATUS

[75] Inventors: William F. Millier, Ithaca; Gerald E. Rehkugler, Dryden; Roger A. Pellerin, Freeville; James A. Throop, Brooktondale, all of N.Y.

[73] Assignee: Cornell Research Foundation, Inc., Ithaca, N.Y.

[21] Appl. No.: 782,217

[22] Filed: Mar. 28, 1977

Related U.S. Application Data

[62] Division of Ser. No. 564,149, Apr. 1, 1975, Pat. No. 4,014,440.

[51] Int. Cl.² .................................................. A01D 46/24
[52] U.S. Cl. ................................................................ 56/329
[58] Field of Search ............. 198/457, 624; 56/328 R, 56/329; 214/6 H, 6 G, 6 D, 6 F, 6 K, 6 P, 6 M, 6 N, 6.5

[56] References Cited

U.S. PATENT DOCUMENTS

| 3,430,425 | 3/1969 | Pool et al. ........................... 56/329 |
| 3,561,205 | 2/1971 | Baker .................................. 56/328 R |
| 3,651,922 | 3/1972 | Ross et al. ........................... 198/457 |

*Primary Examiner*—Russell R. Kinsey
*Attorney, Agent, or Firm*—Lawrence E. Laubscher; Theodore C. Wood; Ralph R. Barnard

[57] ABSTRACT

An improved high capacity harvesting apparatus is disclosed which includes means for rotating an article collecting bin about its central vertical axis as articles are continuously supplied adjacent the central bottom portion of the bin, and for automatically incrementally lowering the bin relative to the article supply means in accordance with the formation of successive layers of articles in the bottom of the bin. Preferably grabber discharge means of the parallel spaced reciprocatory jaw type are provided for gently supplying the articles to the bin. Improved padded roller elevator means are provided for supplying the articles to the grabber discharge means at a relatively high rate from one or more article sources.

2 Claims, 10 Drawing Figures

HIGH CAPACITY HARVESTING APPARATUS

This is a division of application Ser. No. 564,149, filed Apr. 1, 1975 now U.S. Pat. No. 4,014,440.

BRIEF DESCRIPTION OF THE PRIOR ART

In the prior Millier et al. U.S. Pat. No. 3,522,696, harvesting apparatus is disclosed which includes shaker means for shaking fruit from a tree being harvested, and under-tree catcher means for catching the fruit and for conveying the same laterally inwardly toward a vehicle frame for discharge into a water collecting trough. In the patents to Luswell U.S. Pat. No. 3,197,952 and Pool et al. U.S. Pat. No. 3,430,425, harvesting machines are disclosed which include means for collecting harvested fruit and for conveying the same to collection areas. "In-tree" catcher means are disclosed by the patents to Edwards et al. U.S. Pat. No. 3,646,741 and Danford U.S. Pat. No. 3,491,521, and "under-tree" catcher means are disclosed by the patents to Baker U.S. Pat. No. 3,561,205 and Chen et al. U.S. Pat. No. 3,705,486.

In order to expedite the harvesting of fruit from trees, it has been proposed to collect the fruit by both in-tree and under-tree collecting means ("Tree Fruit Harvester With Insertable Multilevel Catching System", by W. F. Millier, G. E. Rehkugler, R. A. Pellerin, J. A. Throop and R. B. Bradley, Transactions of the ASAE, Vol. 16, No. 5, pages 844,850, 1973). Preferably the collecting means should be so arranged that equal quantities of fruit are conveyed thereby laterally inwardly toward the transporting vehicle frame. One drawback to such an article collecting system is that the volume of collected articles is so great that article handling and storing capacity of the machine is greatly exceeded. The present invention was developed to increase the article handling and storing capabilities of a multi-level fruit harvester without increasing the width or length of the machine.

SUMMARY OF THE INVENTION

Accordingly, a primary object of the present invention is to provide an improved bin filling apparatus particularly suitable for use in a multi-level fruit harvesting apparatus, characterized by the provision of means for rotating an empty bin about its central vertical axis, means for supplying articles adjacent the central bottom portion of the empty rotating bin, and means for automatically progressively lowering the rotating bin relative to the article supply means in incremental steps corresponding to the layers of articles formed in the bin. In the illustrated embodiment, the bin is supported on a rotary platform which is connected for vertical movement relative to the harvesting vehicle chassis. Hydraulic piston and cylinder motor means are provided for raising and lowering the rotary platform in accordance with the position of solenoid valve control means. Bin level sensing switch means control the operation of the solenoid valve means to lower the rotary platform and the bin supported thereon in incremental steps in accordance with the level of the articles deposited within the rotating bin.

According to another object of the invention, improved high capacity padded roller elevator means are provided for conveying articles from one elevation to another. The roller elevator means include two parallel vertical stacks of driven compressible rollers, the rollers of one stack being driven in a rotational direction opposite to that of the other. Articles are introduced into the space between the stacks by introduction between a pair of compressible rollers of a given stack, whereby the articles are gripped between the rollers of the stack and are conveyed upwardly or downwardly, depending on the direction of rotation of the rollers. Preferably the axes of rotation of the rollers of one stack are vertically displaced or staggered from the axes of rotation of the corresponding rollers of the other stack. The elevator means are designed for elevating relatively fragile articles such as apples, oranges, eggs and the like. Articles may be introduced between the stacks from the same or opposite sides of the stacks. Furthermore, articles may be introduced at various elevations on one or both sides of the stacks, thereby making the elevator means particularly suitable for use in multi-level harvesting apparatus in which harvested fruit of the multi-level type having in-tree and under-tree catcher means arranged, respectively, to collect nearly equal quantities of articles that are shaken from the tree, said apparatus including a vehicle frame which is relatively narrow (on the order of eight feet, or so) to permit passage through a planned growth of fruit trees (for example, trees spaced 15 feet in rows which are spaced 23 feet). Since apples roll out of the tree at velocities of from 150 feet to 200 feet per minute, in order to keep apple collisions to a minimum, the fruit is caused to move at these velocities into the field container. Elevator means of the padded roll type are provided for transporting the articles from the in-tree and under-tree catchers to a common level for introduction into high capacity bin filling means which are operable to handle fruit at rates as high as 10 to 12 bushels per minute, thereby to prevent fruit pile-up and numerous fruit-to-fruit collisions. The bin filling means include means for rotating and automatically lowering the bin during the filling operation, and for unloading the filled bins from the harvesting vehicle frame.

BRIEF DESCRIPTION OF THE DRAWINGS

Other objects and advantages of the invention will become apparent from a study of the following specification when viewed in the light of the accompanying drawing, in which.

DETAILED DESCRIPTION

Figure 1:
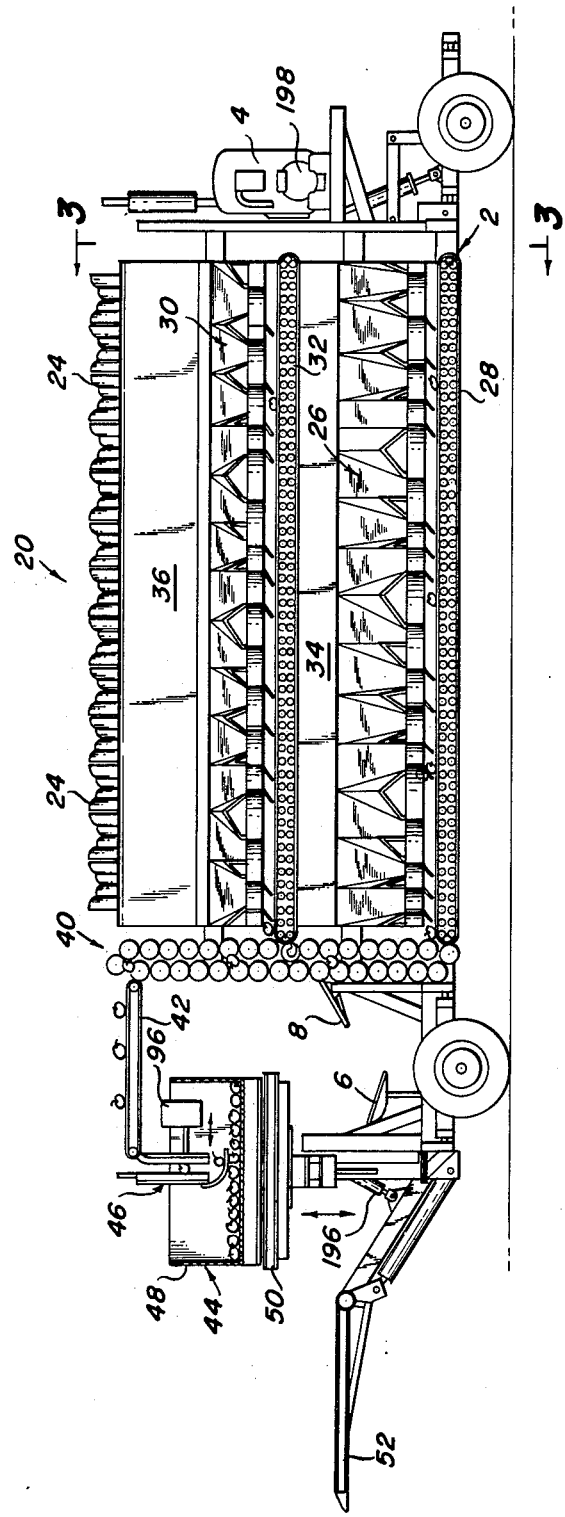
FIGS. 1 and 2 are side elevation and top plan views, respectively, of the improved high capacity harvesting apparatus of the present invention.
Figure 2:
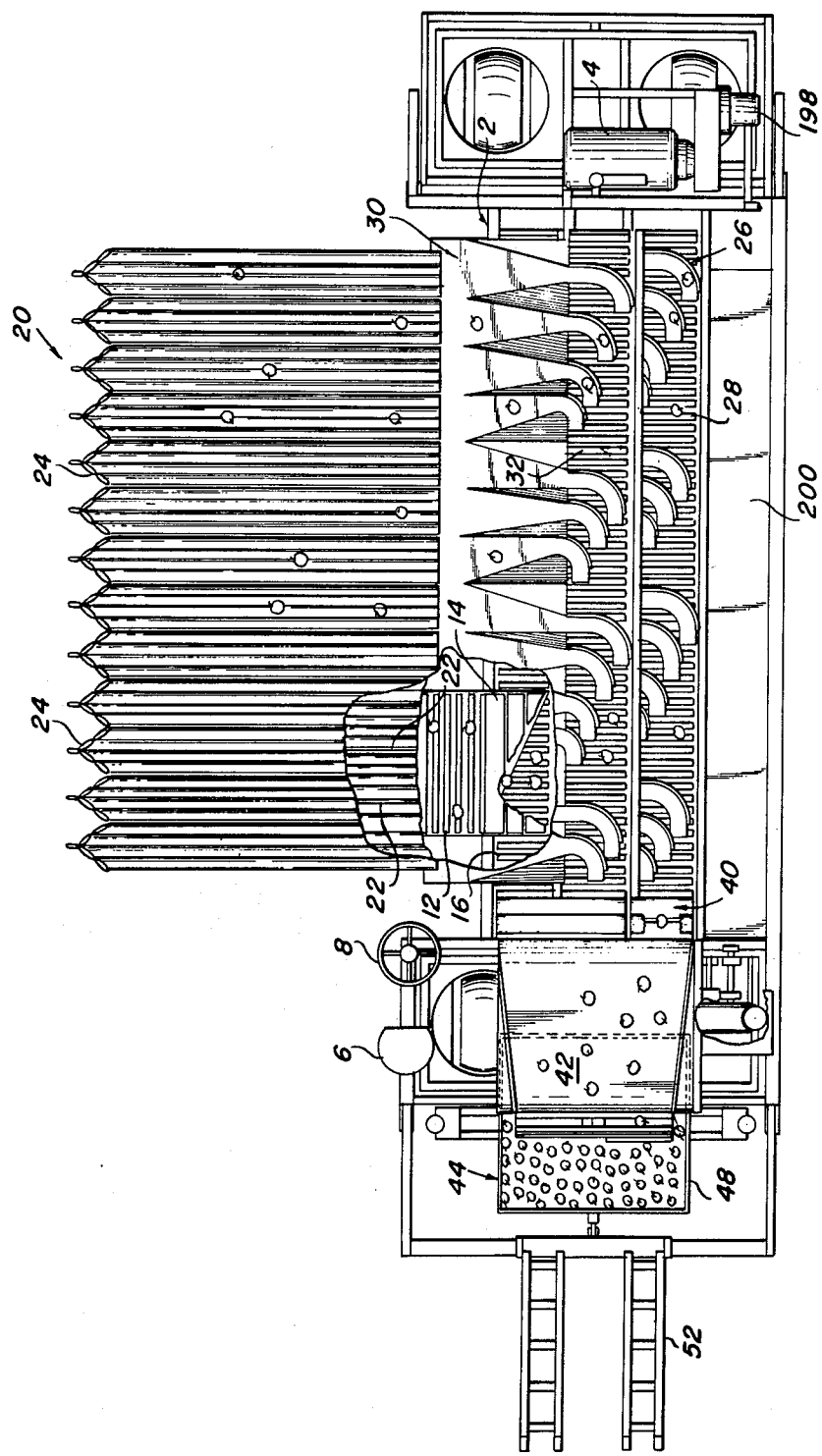
Figure 3:
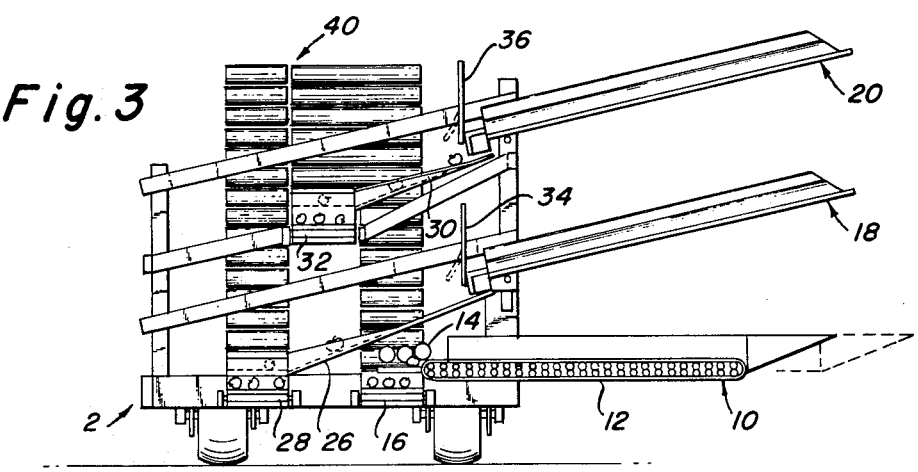
FIG. 3 is a sectional view taken along line 3—3 of FIG. 1.

Referring first more particularly to FIGS. 1-3, the improved harvesting apparatus includes a vehicle chassis frame 2 upon the front end of which is mounted an internal combustion engine 4 and adjacent the rear end of which is mounted a driver's seat 6 and a steering wheel 8 for steering the vehicle. Connected with the left hand side of the frame by linkage means (not shown) is horizontal under-tree catcher means 10 which is laterally extensible and retractable between catching and unloading positions (FIG. 3) relative to a tree being harvested. Furthermore, the under-tree catcher means is upwardly pivotable (by hydraulic piston and cylinder means, not shown) about a horizontal pivot axis adjacent the frame to an inoperable vertical transport position parallel with the longitudinal axis of the frame. Endless conveyor means 12 carried by the under-tree catcher serve to convey articles deposited thereon (for example, fruit shaken from a tree by shaker means, not shown) laterally inwardly toward the chassis frame. Roll pad feeder means 14 connected with the frame assist in transferring the articles from the lateral conveyors 12 (when the under-tree catcher means is in the unloading retracted position illustrated in solid lines in FIG. 3) to first horizontal longitudinal conveyor means 16 connected with the frame 2.

Also connected with the vehicle frame 2 are vertically spaced lower and upper laterally extensible and retractable in-tree catcher units 18 and 20, respectively. Each of the in-tree catcher units includes a rigid frame to which is connected a plurality of parallel rods 22 about which are mounted inflatable bags 24 (formed of synthetic plastic material, for example). As shown in FIG. 2, the rods are so arranged relative to each other that the inflated bags thereon define troughs for receiving the articles shaken from the tree. The in-tree catcher units are upwardly inclined (as shown in FIG. 3) so that the articles deposited thereon are transported by gravity laterally inwardly toward the vehicle frame 2. The articles from the lower in-tree catcher 18 are conveyed by synthetic — foam — padded funnel and curved turning chute means 26 to a second horizontal longitudinal conveyor 28 on the frame, and the articles from the upper in-tree catcher 20 are conveyed by padded funnel and curved turning chute means 30 to a third horizontal longitudinal conveyor 32 centrally arranged above and between the first and second longitudinal conveyors 16 and 28. Synthetic foam drape means 34 and 36 retard the flow of articles from the inflated troughs into the padded funnel means 26 and 30, respectively.

During transport of the vehicle, the in-tree catcher units 18 and 20 are completely retracted axially into the vehicle frame from their extended in-tree catching positions illustrated in FIG. 3, thereby permitting the under-tree catcher means 10 to be pivoted upwardly to the transport position as described above.

In accordance with a first characterizing feature of the present invention, padded roll elevator means 40 are provided for elevating to an upper level the articles that are transported by the horizontal longitudinal conveyors 16, 28 and 32 rearwardly of the vehicle frame 2. The articles are discharged from the upper end of the elevator means upon a fourth horizontal longitudinal conveyor 42. In accordance with a second characterizing feature of the invention, the conveyor 42 conveys the articles rearwardly of the frame 2 for discharge into rotatable vertically-adjustable collecting bins means 44 via reciprocatory grabber means 46 which gently lower and distribute the articles into the bin 48 of the rotary collecting bin means. As will be described in greater detail below, the rotary collecting bin means are automatically progressively lowered in a step-by-step manner in accordance with the layers of articles deposited in the bin means, thereby effecting even distribution of the articles without damaging the same. After a collecting bin 48 has been filled, rotation of the collecting bin means is terminated and the filled bin is rolled off of the bin supporting platform 50 upon bin unloading means 52 which is operable to gently deposit the filled bin 48 upon the ground (or upon auxiliary truck-loading means, for example).

Figure 4:
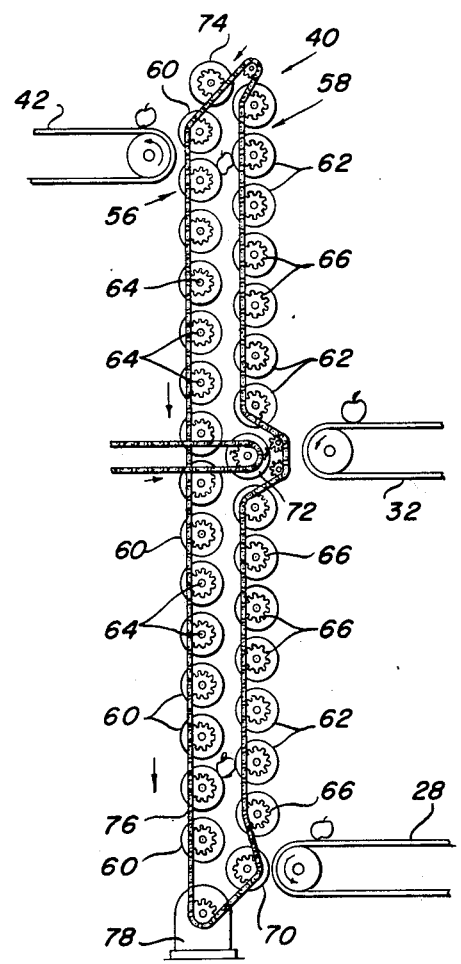
FIG. 4 is a detailed side elevation view of the article elevator means.

Referring now to FIG. 4, the padded roll elevator means 40 includes first and second parallel vertical stacks 56 and 58 of horizontal rollers 60 and 62, respectively, each formed of a suitable resilient compressible material (such as charcoal polyether isothane form, synthetic or natural rubber foam, or the like) and provided at each end with drive sprockets 64 and 66, respectively. At the bottom of the right hand stack of rollers 58 is provided a delivery roller 70 opposite the ends of the horizontal longitudinal conveyors 66 and 28, respectively, and opposite the end of horizontal longitudinal conveyor 32 is provided a further delivery roller 72. As shown in FIG. 4, the axes of delivery rollers 70 and 72 are slightly offset in the direction of the first stack 56. The delivery roller 70 and adjacent rollers 62 may be divided into two longitudinally spaced roller groups, as shown in FIG. 3. At the top of the stacks is provided a discharge roller 74 the axis of which is offset from the rollers of stack 56 in the direction of roller stack. Sprocket chain 76 driven by hydraulic motor 78 drives rollers 60, 70 and 72 in the counterclockwise direction, as shown, and further drives rollers 62 and 74 in the clockwise direction, as shown. Furthermore, the rollers 62 of the second stack 58 are vertically offset or staggered from the corresponding rollers 60 of the first stack 56. Consequently, articles introduced between the stacks from conveyors 16 and 28 by the delivery roller 70 and the adjacent roller 62, and from conveyor 32 by the delivery roller 72 and the adjacent roller 62, are gripped between the compressible rollers, conveyed upperwardly between the stacks and are discharged upon the fourth horizontal longitudinal conveyor by the cooperation between discharge roller 74 and the adjacent roller 60. Preferably all of the rollers and sprockets are of the same size and the rollers have the same compressibility, whereby the articles will be conveyed without rotation upwardly between the roller stacks. On the other hand, in the event that rotation of the articles is desired during upward transport through the roller elevator means, the rollers may be caused to have unequal peripheral velocities by appropriate modification of the rollers and/or the sprockets associated therewith. Furthermore, in the event that the elevator means is to be used with a different type, species or size of article, one (or both) of the stacks may be connected with the frame by suitable adjustment means (not shown) which permit longitudinal adjustment of the stack (or stacks) relative to the frame, thereby affording variations in the spacing between the stacks.

While in the illustrated embodiment, the articles have been illustrated as being introduced into one side of the elevator means, it is apparent that in accordance with the instant invention, articles could be introduced at desired levels from the other side of the stack. Owing to the surface characteristics of the resilient rolls, the articles are gripped securely, thereby providing positive feeding without hesitation in the motion of the objects.

Figure 5:
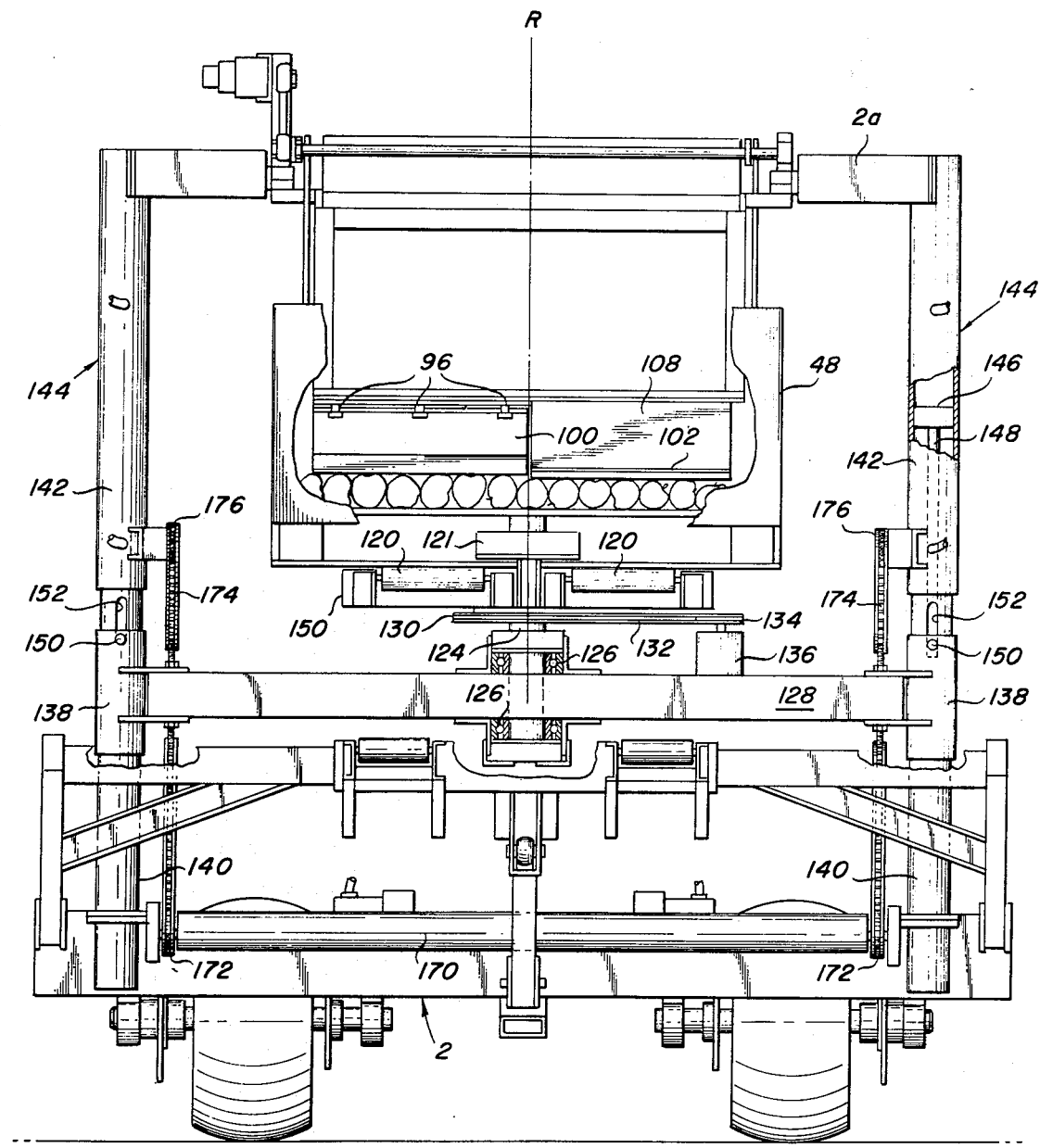
FIGS. 5 and 6 are detailed partially sectioned rear and side elevation views, respectively, of the automatic bins filling means.
Figure 6:
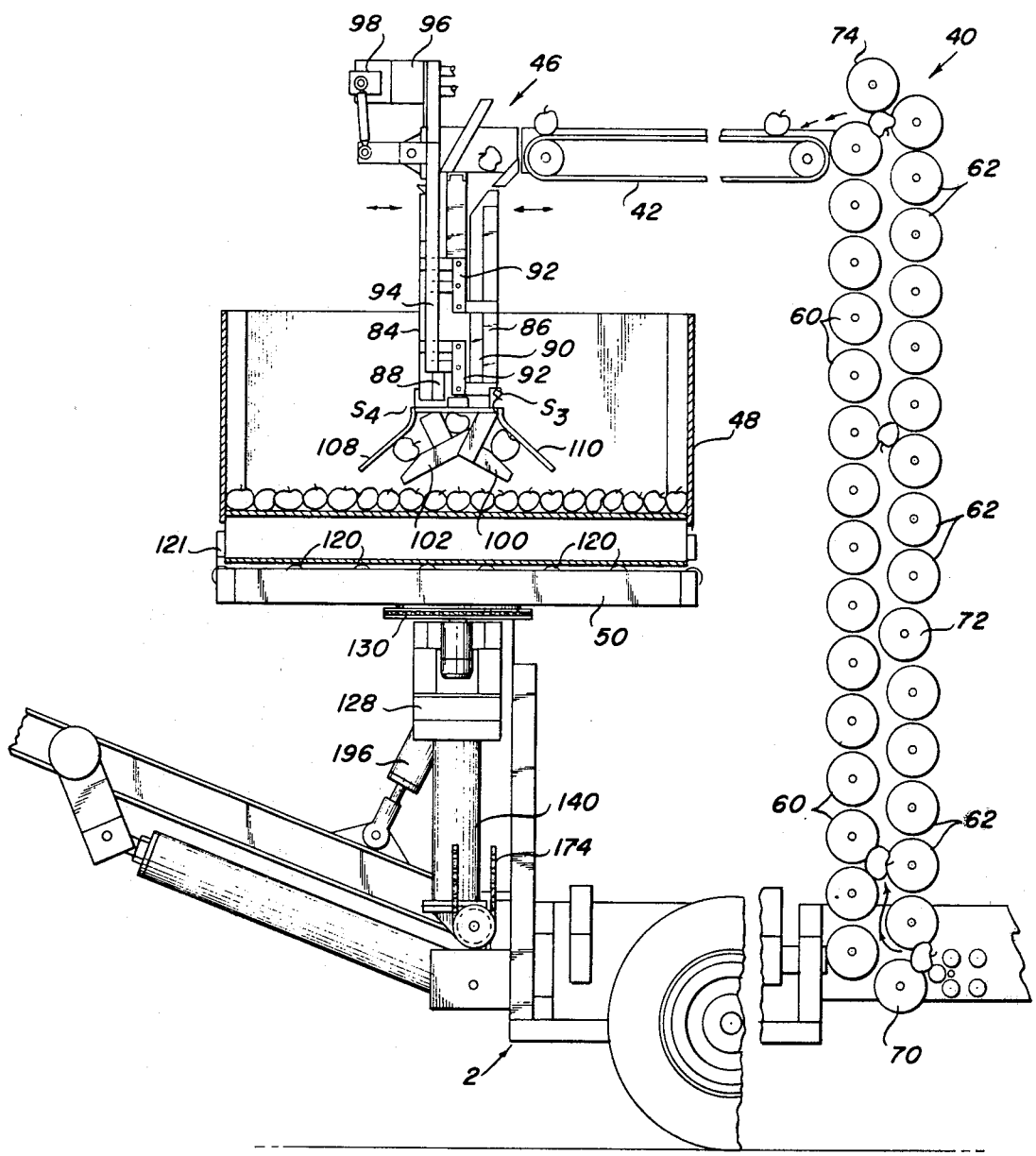
Figure 7:
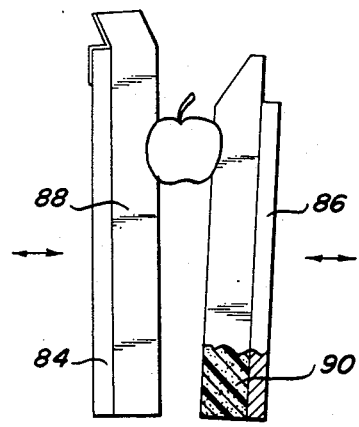
FIGS. 7 and 8 are detailed end elevational views illustrating the operation of the grabber means in the closed and open positions, respectively.
Figure 8:
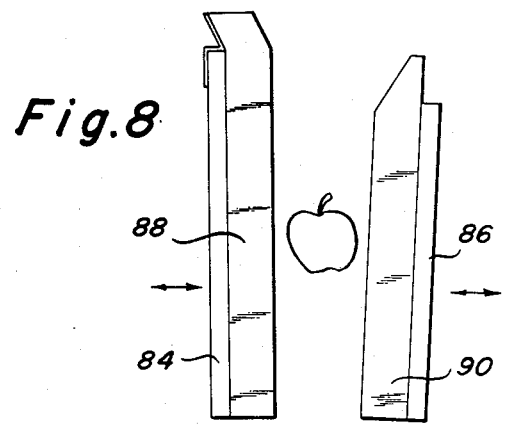

Referring now to FIGS. 5 and 6, articles on the conveyor 42 are conveyed rearwardly of the frame 2 for discharge into the bin 48 via the grabber means 46 which gently lowers the articles into the bin. More particularly, the grabber means includes a pair of spaced vertical members 84, 86 the adjacent surfaces of which are faced with spaced resilient compressible grabber pads 88, 90, respectively, formed of a suitable material, such as charcoal polyether isothane foam, synthetic or natural rubber foam, or the like. The vertical grabber members 84, 86 are connected by linkage means 92 which are operable by vertical arm 94 to reciprocate the grabber members 84 and 86 toward and away from each other. The grabber means, which is supported from horizontal top stationary frame member 2a, further includes hydraulically operable vibrating means 96 including a crank arm 98 connected with the arm 94 for vibrating the grabber members via linkage means 92. As shown in FIGS. 7 and 8, the spaced grabber pads 88 and 90 converge slightly in the downward direction. When the support members 84 and 86 reciprocate toward each other to the closed position of FIG. 7, the articles therebetween are gripped and maintained stationary by the pads 88 and 90, and when the support members are displaced apart to the open condition of FIG. 8, the articles are released and drop downwardly by gravity. Preferably the speed of reciprocation of the support members 84 and 86 is such that the articles are gripped several times during their transport between the grabber pads. The tapering of the grabber pads causes a reduction in the distance that the article falls between successive grabs as it passes through the grabber means. Furthermore, the last grab is adjacent the exit point, thereby resulting in lower average article velocities at exit.

The grabber means 46 is centrally arranged relative to the axis of rotation R of the bin-supporting platform 50. At the lower end of the stationary frame of the grabber means are pivotally connected by hinge means 96 and 98 a pair of level sensing and deflecting pads 100 and 102, respectively, each having in transverse cross-section a generally L-shaped configuration. As will be described in greater detail with regard to the electrical circuit of FIG. 9, the pads 102 and 100 operate switches $S_3$ and $S_4$ via cam means 104 and 106, respectively. A pair of flexible restraining flaps 108 and 110 are connected at their upper ends with the lower portions of the stationary frame of the grabber means 46 above and in spaced relation to the sensing pads 102 and 100, respectively. There flaps cooperate with the sensing pads to restrain discharge into the bin 48 of the articles discharged by the grabber pads 88 and 90. The sensing pads 100, 102 are formed of a suitable compressible material, such as the closed cell polyvinyl chloride material sold by Akron No. 501-B. The restraining flaps 108 and 110 are formed of a suitable flexible synthetic foam material, and the conveyor means 42 comprises a flexible wide padded belt of suitable material. The bins 48 are of standard construction and size (for example, in the case of apples, a bin having a 20 bushel capacity). The pads 100 and 102 each serve half of the lowering unit. Since the bin is rotating the articles, the pads are directed so that the direction of deposit of the articles is similar to that of the fruit surface. This requires that articles from one-half the length of the grabber be directed one way, and articles from the other half in a direction 180° from the first.

Rotatably mounted on the upper surface of the rotary bin-supporting platform 50 are a plurality of parallel support rollers 120 by means of which a bin 48 is rolled onto and off of the platform. Bin locking means 121 pivotally connected with platform 50 are operable by locking arm 122 to lock the bin 48 to the platform 50. The platform 50 has a centrally arranged downwardly depending vertical shaft 124 that is journalled in vertical bearings 126 carried by the horizontal platform support beam 128. The shaft 124 has a sprocket 130 non-rotatably secured thereto, and the shaft is rotatably driven by sprocket chain 132 and the sprocket 134 of hydraulic drive motor 136 which is also rigidly mounted on the support beam 128. At each end the support beam is rigidly connected with vertical tubular sleeve members 138 that are slidably mounted concentrically upon tubular vertical frame members 140 rigidly connected with the vehicle chassis frame 2.

Figure 10:
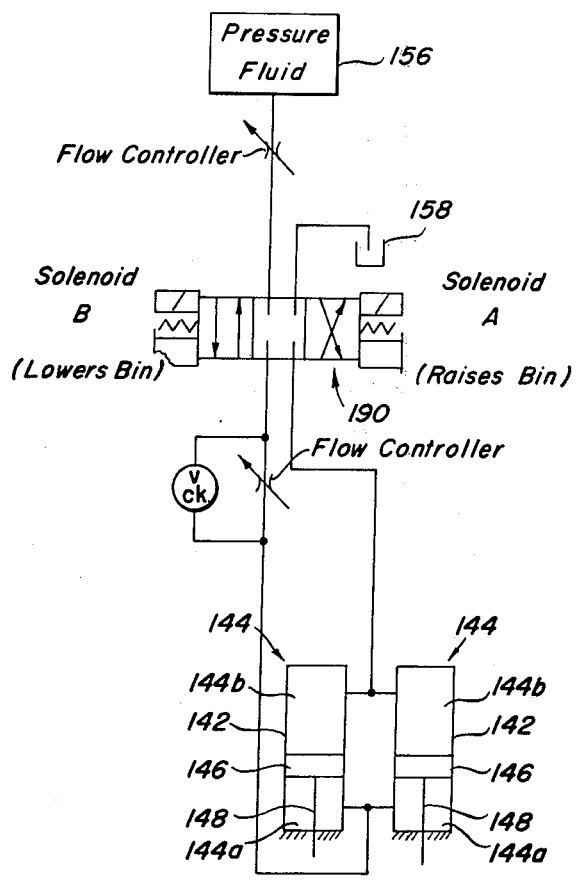

Rigidly connected with the upper ends of the tubular vertical frame members 140 are the stationary cylinder members 142 of hydraulic piston and cylinder motor means 144 (FIGS. 5 and 10). The hydraulic motor means also include movable piston members 146 arranged in the cylinders 142, said piston members having piston rods 148 that extend downwardly into the tubular vertical frame members 140. At their lower ends, the piston rods are connected with the vertically slidable sleeves 138 by horizontal rods 150 that extend through vertical slots 152 contained in the tubular members 140. Consequently, when pressure fluid from source 156 is supplied to the working chambers 144a beneath the pistons 146 and the chambers 144b above the pistons are connected with sump 158, pistons 146, piston rods 148, sleeves 138, platform support beam 128, platform 150 and bin 48 are displaced upwardly as a unit relative to the frame 2 and the article-lowering grabber means 46. Similarly, when the chambers 144a and 144b are connected with sump and with the pressure fluid source, respectively, the bin 48 and supporting platform unit are displaced downwardly relative to the frame 2 and grabber means 46.

In order to stabilize the bin supporting unit and to equalize the forces acting thereon during its vertical displacement relative to the vertical frame members 140, a horizontal conventional torque tube 170 is rotatably connected at opposite ends with the vehicle chassis frame 2. The torque tube 170 is provided at opposite ends with rigidly connected torque sprockets 172. Sprocket chains 174 are each connected at one end with the bottom of horizontal platform support beam 128, extend under the torque sprockets 172, and upwardly around idler sprockets 176 connected with the stationary cylinders 142 for connection at their other ends with the upper side of platform support beam 128. Thus, vertical movement of the ends of platform support bar 128 are equalized by the sprocket chains 174 and torque tube 170 to prevent binding of the sleeves 138 on the vertical frame members 140.

Figure 9:
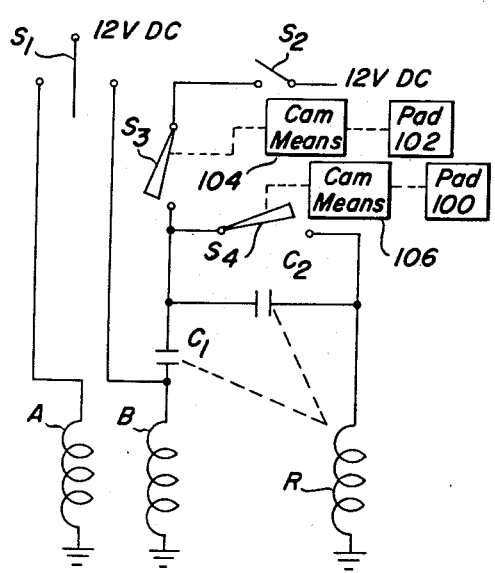
FIGS. 9 and 10 are schematic diagrams of the electrical and hydraulic control circuits, respectively, of the bin filling means.

Referring now more particularly to FIGS. 9 and 10, the pressure fluid source 156 and sump 158 are connected with the hydraulic piston and cylinder motor means 144 via solenoid valve means 190 that are alternately operable between bin-raising and bin-lowering positions by solenoids A and B, respectively. Thus, when solenoid A is energized, hydraulic motor chambers 144a are pressurized and chambers 144b are connected with sump, thereby raising the bin 48 relative to the frame 2. When solenoid B is energized, chambers 144b are pressurized and chambers 144a are connected with sump, thereby lowering the bin 48 relative to the frame. Conventional check valve and flow controller means are provided between the hydraulic motors and the solenoid valve means to permit rapid bin platform raising and slow bin platform lowering.

Solenoid A is connected at one end with a 12 volt direct-current voltage source via one stationary contact of the manually operable single-pole double-throw override switch $S_1$, the other end of solenoid A being connected with ground. A first end of solenoid B is connected with the other stationary contact of switch $S_1$, the other end of solenoid B being connected with ground. The first end of solenoid B is also connected with a second 12 volt direct-current voltage source via normally open relay contact $C_1$, cam-operated single-pole single-throw switch $S_3$ (which is operated by cam means 104 and level sensing pad 102) and manually-operable single-pole single-throw automatic bin-lowering switch $S_2$. Holding relay R is connected at a first end with the second 12 volt voltage source via single-pole single-throw cam-operated switch $S_4$ (which is operable by cam means 106 and level sensing pad 100), cam-operated switch $S_3$, and automatic bin-lowering switch $S_2$. Normally-open relay contact $C_2$ is connected in parallel across switch $S_4$. Relay R 4 energizable to close the normally-open relay contacts $C_1$ and $C_2$. The cam means 104 and 106 are so designed that upon raising of the bin relative to the grabber discharge means upon which the switches $S_3$ and $S_4$ and the associated level sensing pads 102 and 100 are mounted, switch $S_3$ is closed before switch $S_4$. Similarly, the cam means are such that upon lowering of the bin, switch $S_4$ is opened before switch $S_3$. In the event that continuous lowering of the bin is desired, override switch $S_1$ is operated to continuously energize solenoid B.

OPERATION

Assuming that an empty bin 48 has been placed on the platform 50 when in a lowered condition, upon operation of override switch $S_1$ to energize solenoid A, solenoid valve means 190 is shifted to the right to pressurize chambers 144a and to connect chambers 144b to sump, thereby to initiate raising of the bin 48 relative to the grabber discharge means 46. When the bin has been raised to a position in which the level sensing pads 100 and 102 engage the bottom of the empty bin (thereby closing switches $S_3$ and $S_4$), override switch $S_1$ is shifted to its illustrated inoperative position to de-energize the bin-raising solenoid A, whereupon solenoid valve means 190 is shifted to its illustrated de-energized position (by conventional spring means). Rotation of bin support platform 150 by hydraulic motor 136 and operation of the conveyor, elevator and grabber means is initiated, and switch $S_2$ is closed to initiate automatic step-by-step lowering of the bin in accordance with the level of the articles discharged into the bin by the grabber discharge means 46. More particularly, upon closing of the switch $S_2$, relay R is energized via closed switches $S_3$ and $S_4$, thereby closing relay contacts $C_1$ and $C_2$ to energize solenoid B and to short circuit the switch $S_4$. Upon energization of solenoid B, the solenoid valve means 190 is shifted to the left to effect pressurization of chambers 144b and to connect chambers 144a with sump, whereby lowering of the bin 48 relative to grabber discharge means 46 is initiated. Switch $S_4$ is then opened, but owing to the closed holding contacts $C_1$ and $C_2$ remain energized. When the bin has been incrementally lowered to the position at which bin level sensing pad 102 opens switch $S_3$, solenoid B and holding relay R are de-energized, solenoid valve means 190 is shifted by spring means (not shown) to the illustrated neutral position, and lowering of the bin is terminated. The bin continues to be rotated by motor 136 and the articles continue to be discharged into the bin by the grabber discharge means 46. Owing to the relative slow (about 12 rpm) rotational movement of the bin, the first layer of articles become evenly distributed upon the bottom of the bin. As the formation of the first layer of articles approaches completion, switch $S_3$ is closed, but since relay R and solenoid B are de-energized, the bin remains at its first incrementally lowered position. When switch $S_4$ is finally closed by the first layer of articles, relay R and solenoid B are energized to initiate lowering of the bin by a second incremental step. Switch $S_4$ is opened but solenoid B continues to be energized to continue lowering of the bin to the end of the second incremental step, whereupon switch $S_3$ is opened to de-energize solenoid B. The bin then continues to rotate at the second lowered incremental height as articles continue to be discharged into the rotating bin. The incremental lowering of the bin in accordance with the level of the articles therein is repeated until the bin has been completely filled, whereupon supply of articles to the grabber discharge means is interrupted, grabber discharge means are rendered inoperable, rotation of the bin by motor 136 is terminated, and bin locking arm 122 is operated to release the bin. The filled bin is then rolled onto the bin unloading platform 52, and the hydraulic motor 196 (FIGS. 1 and 6) is operated to lower the unloading platform to a position permitting unloading of the filled bin therefrom.

A pump 198 driven by the engine 4 supplies the pressure hydraulic fluid to the various hydraulic motors and cylinders used in the apparatus. The hydraulic controls for the various motors and cylinders are conventional and have not been illustrated or described. The hydraulic fluid tank 200 extends longitudinally of the vehicle chassis frame 2 on the opposite side thereof from the under-tree and in-tree catcher units, thereby to afford improved weight balance of the vehicle.

The apparatus is designed to afford high capacity bin filling operation with minimal damage of the articles.

The resilient roll elevator was developed specifically to lift apples vertically at a high rate of speed without causing any physical damage to the soft apple varieties. The same device can be used to handle a variety of "fragile" objects at any angle from horizontal to vertical with direction of movement either upward or downward. Its application in the handling of fruits and vegetables is widespread. The same device can be scaled for a large variety of object sizes. For example it could handle eggs at high rates without damage.

Although the bin has been illustrated as being of generally rectangular configuration, it is apparent that the bin could be of square, cylindrical or other configuration.

While in accordance with the provisions of the Patent Statutes the preferred form and embodiment of the invention has been illustrated and described, it will be apparent to those skilled in the art that various changes and modifications may be made in the apparatus described without deviating from the inventive concepts set forth above.

What is claimed is:

1. High-capacity multi-level harvesting apparatus, comprising
    (a) a vehicle frame adapted for transport relative to a tree to be harvested;
    (b) a plurality of catcher means connected with said frame at different elevations thereon for receiving articles harvested from said tree;
    (c) bin filling means connected with said frame, said bin filling means including downwardly directed article discharge means rigidly connected with said frame, rotary bin-supporting platform means connected with said frame for vertical displacement beneath said article discharge means, means for raising said platform means to an empty bin filling position relative to said article discharge means, level sensing means responsive to the layers of articles deposited in said bin for incrementally lowering said platform in steps corresponding with the vertical height of said layers, and means for continuously rotatably driving said platform means; and (d) conveyor means for transporting articles from said catcher means to said article discharge means, said conveyor means including padded roller elevator means including a pair of parallel spaced stacks of parallel horizontal rollers, the roller stacks having a greater elevation at one end than at the other, the rollers of one stack being driven in one direction and the rollers of the other stack being driven in the opposite direction, the articles from at least two of said catcher means being introduced between the stacks at locations which are longitudinally spaced along said roller stacks.

2. Apparatus as defined in claim 1, wherein said article discharge means comprises grabber discharge means including a pair of vertical spaced parallel jaws the adjacent faces of which are faced with a compressible material, and means for reciprocating said jaws toward and away from each other to intermittently grip articles which fall by gravity downwardly between said jaws.

* * * * *